(12) United States Patent
Kursun et al.

(10) Patent No.: US 10,616,256 B2
(45) Date of Patent: Apr. 7, 2020

(54) CROSS-CHANNEL DETECTION SYSTEM WITH REAL-TIME DYNAMIC NOTIFICATION PROCESSING

(71) Applicant: BANK OF AMERICA CORPORATION, Charlotte, NC (US)

(72) Inventors: Eren Kursun, New York, NY (US); Craig D. Widmann, Chandler, AZ (US); Dharmender Kumar Satija, Rye Brook, NY (US); Andrew DongHo Kim, Glendale, AZ (US); Shawn Parris Bench, Wilmington, DE (US); Kolt Arthur Bell, Charlotte, NC (US); Scott Anderson Sims, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 261 days.

(21) Appl. No.: 15/921,395

(22) Filed: Mar. 14, 2018

(65) Prior Publication Data
US 2019/0289025 A1 Sep. 19, 2019

(51) Int. Cl.
*H04L 29/06* (2006.01)
*H04L 12/26* (2006.01)
*G06N 20/00* (2019.01)
*G06F 16/28* (2019.01)
*H04L 29/08* (2006.01)

(52) U.S. Cl.
CPC ........ *H04L 63/1425* (2013.01); *G06F 16/285* (2019.01); *G06N 20/00* (2019.01); *H04L 43/04* (2013.01); *H04L 67/18* (2013.01)

(58) Field of Classification Search
CPC .................................................. H04L 63/1425
See application file for complete search history.

(56) References Cited

U.S. PATENT DOCUMENTS

| 7,174,534 B2 | 2/2007 | Chong et al. |
| 8,599,014 B2 | 12/2013 | Prykari et al. |
| 9,124,621 B2 | 9/2015 | Manadhata et al. |
| 9,166,997 B1 * | 10/2015 | Guo .................... H04L 63/1433 |
| 9,367,843 B2 | 6/2016 | Jurss |
| 9,406,057 B2 | 8/2016 | Hammad et al. |
| 9,601,000 B1 * | 3/2017 | Gruss ..................... G06F 21/31 |
| 9,928,366 B2 * | 3/2018 | Ladnai .................. G06F 21/554 |

(Continued)

*Primary Examiner* — Peter C Shaw
(74) *Attorney, Agent, or Firm* — Michael A. Springs; Moore & Van Allen PLLC; Nicholas C. Russell

(57) ABSTRACT

The invention describes a system and method employing machine learning and artificial intelligence engines to monitor data streams in real-time across multiple channels in order to detect anomalies and generate prioritized alerts. In particular, the invention may continuously collect data across multiple channels. The obtained data may be compared with reference data to continuously update a confidence level associated with the user, channel, entity, or other identifying factor. The invention may detect any inconsistencies in the data collected over time and generate an alert to the user in question and potentially to other downstream users or entities. In this way, the invention not only provides a way to detect anomalies in a cross-channel fashion, but also creates a mechanism for feedback wherein the system may incorporate user feedback to resolve alerts and detected anomalies.

18 Claims, 6 Drawing Sheets

(56) References Cited

U.S. PATENT DOCUMENTS

| | | |
|---|---|---|
| 2002/0133462 A1 | 9/2002 | Shteyn |
| 2004/0078340 A1 | 4/2004 | Evans |
| 2004/0236859 A1 | 11/2004 | Leistad et al. |
| 2006/0059110 A1 | 3/2006 | Madhok et al. |
| 2008/0167990 A1 | 7/2008 | Grant |
| 2008/0183480 A1 | 7/2008 | Carlson et al. |
| 2010/0287597 A1 | 11/2010 | Richins et al. |
| 2011/0055058 A1 | 3/2011 | Hammad et al. |
| 2011/0238564 A1 | 9/2011 | Lim et al. |
| 2012/0259784 A1 | 10/2012 | Carlson et al. |
| 2014/0157405 A1 * | 6/2014 | Joll .................... H04L 63/1425 726/22 |
| 2016/0019388 A1 | 1/2016 | Singla et al. |
| 2016/0307180 A1 | 10/2016 | Hammad et al. |
| 2017/0083912 A1 | 3/2017 | Hammad et al. |

* cited by examiner

CROSS-CHANNEL DETECTION SYSTEM WITH REAL-TIME DYNAMIC NOTIFICATION PROCESSING

BACKGROUND

Network anomaly detection systems generate a large number of alerts for transactional and non-transactional events, and current systems sort alert messages based on strategy and rule queues or product/channel specific queues. Due to the large number of network anomaly alerts generated in real-time, a lack of prioritization causes impacts from processing of alerts and complete loss of alerts due to bandwidth and processing speed constraints.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Determining potential resource impact across multiple channels can be challenging as users, entities, and channels themselves have wide ranges of diversity in resource distribution patterns, data points, interactions, transactions over time, and the like. The system utilizes machine learning and artificial intelligence (AI) modeling engines to identify cross-channel anomalies and potential resource impact and utilizes a graph database to visualize the relationship between channels and potential effects of identified anomalies.

In some embodiments, the invention uses cross-channel data integration, analysis, and response to provide real-time resource impact prediction and prevention. Integration of data from multiple channels is performed in real-time by processing various associated data streams, and merging data with respect to user identification characteristics, entity identification characteristics, client identification characteristics and the like across different on associated and shared entities. The system may then implement cross-channel data analysis by employing single channel and multi-channel machine learning engines whereby multi-channel engines may focus on both cross-channel and cross-entity relationships and modeling. The system may then generate a cross-channel response resulting in preemptive action to prevent predicted resource impacts. In some embodiments, alerts may utilize bi-directional information sharing in order to continuously update relevant data and further prevent negative resource impacts. Similarly if one alert in channel is marked as high-priority, the associated transactions and alerts in other channels as well as responses may be coordinated to provide an instantaneous escalation of alert priority and response across channels.

In some embodiments, the invention uses predicted resource impacts associated with the processing of an alert, or in some embodiments, a specific transaction, in a cross-channel optimization wherein the system may prioritize the alerts based on predicted resource impact value. In this context, the system may calculate and account for resource impact amount, (quantified based on metrics such as resource impact per transaction, resource impact per channel, resource impact per account, resource impact per user, and the like), the nature of the resource impacts (recoverable or unrecoverable), the operational costs, the predicted downstream resource impacts, and any emerging patterns or vulnerabilities that may be associated with the predicted resource impacts. The system may also identify alerts associated with a specific device type, and may scale the potential resource impact based on such device type characteristics and access rights.

In some embodiments, the invention utilizes machine learning of data patterns and behavior modeling to identify normal resource distribution of a user across multiple channels. In this way, the system utilizes multiple processes for identification of normal resource distribution of the user for identification of authenticity of transactions or other resource distributions in real-time to prevent misappropriation at the point of resource transfer.

When a potential for misappropriation is identified, the system may generate pre-emptive alerts to prevent future misappropriation at the point of resource transfer. In some embodiments, the system utilizes collective analysis across channels for authenticity identification. In some embodiments, the system utilizes neural network cross training for authenticity identification. In some embodiments, the system utilizes hierarchical clustering for authenticity identification. In some embodiments, the system utilizes misappropriation analysis for authenticity identification.

Accordingly, embodiments of the present invention provide a system, a computer program product, and a computer-implemented method for cross-channel detection with real-time dynamic alert processing and prioritization. The invention may comprise receiving data from a plurality of data channels, wherein the data channels represent disparate streams of data, integrating the disparate data streams from the plurality of data channels in real-time, receiving reference data from internal and external databases, wherein the reference data is categorized according to entity, user, and transaction identification characteristics, analyzing the integrated data and the received reference data using single-channel and multi-channel machine learning engines to identify an anomaly in the integrated data, calculating a resource impact prediction for the identified anomaly, and generating a cross-channel alert across plurality of data channels with a priority level determined by the resource impact prediction.

In some embodiments, the system is further configured to identify two or more anomalies occurring in a specified channel within a predefined time period, determine that an pattern of unauthorized activity is emerging in the specified channel, identify one or more potentially impacted users within the specified channel, and transmit a pre-emptive alert to the one or more potentially impacted users.

In some embodiments, the system further comprises analyzing the resource impact prediction in a second specified channel for the one or more potentially impacted users, and transmitting a second pre-emptive alert to the one or more potentially impacted users over the second specified channel.

In some embodiments, the system further comprises identifying a geographic region affected by the emerging pattern of unauthorized activity, receiving location data for the one or more potentially impacted users via one or more of the plurality of data channels, identifying a number of potentially impacted users as located within the geographic region affected by the emerging pattern of unauthorized activity, and transmitting the pre-emptive alert to the number of potentially impacted users located within the geographic region affected by the emerging pattern of unauthorized activity.

In some embodiments, the system further comprises combining the data into an entity or user profile based on user identification characteristics or transaction identification characteristics.

In some embodiments, the resource impact prediction is calculated for a specific resource transfer, user, channel, or entity, and wherein the resource impact prediction is categorized as recoverable or unrecoverable.

In some embodiments, the system is further configured to transmit the cross-channel alert to a plurality of affected users, wherein the alert contains a description of the identified anomaly and a request for verification information, receive responses from the plurality of affected users, wherein the responses contain a verification of the identified anomaly, and resolve the cross-channel alert based on the received verifications from the plurality of affected users.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
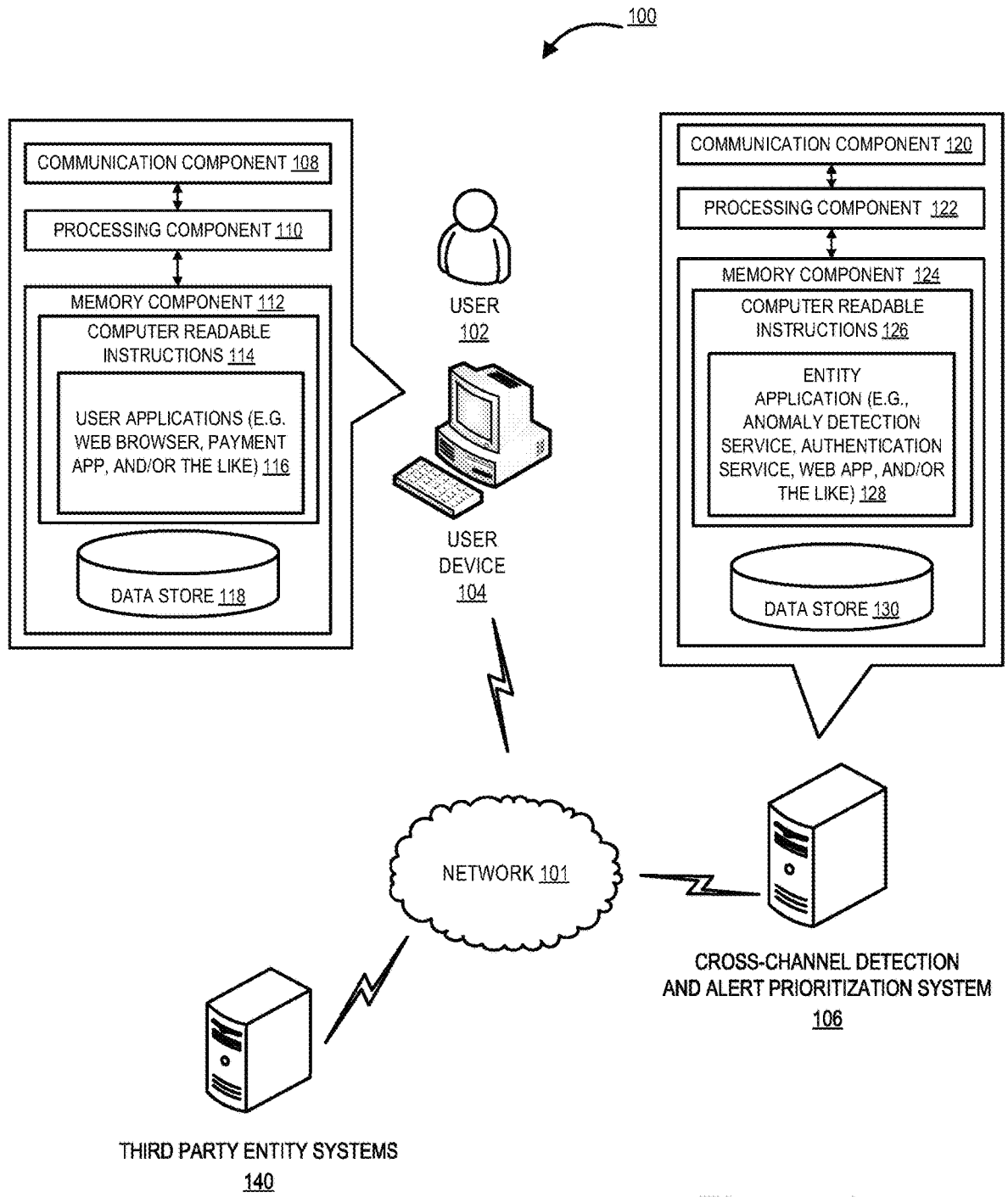
Figure 2:
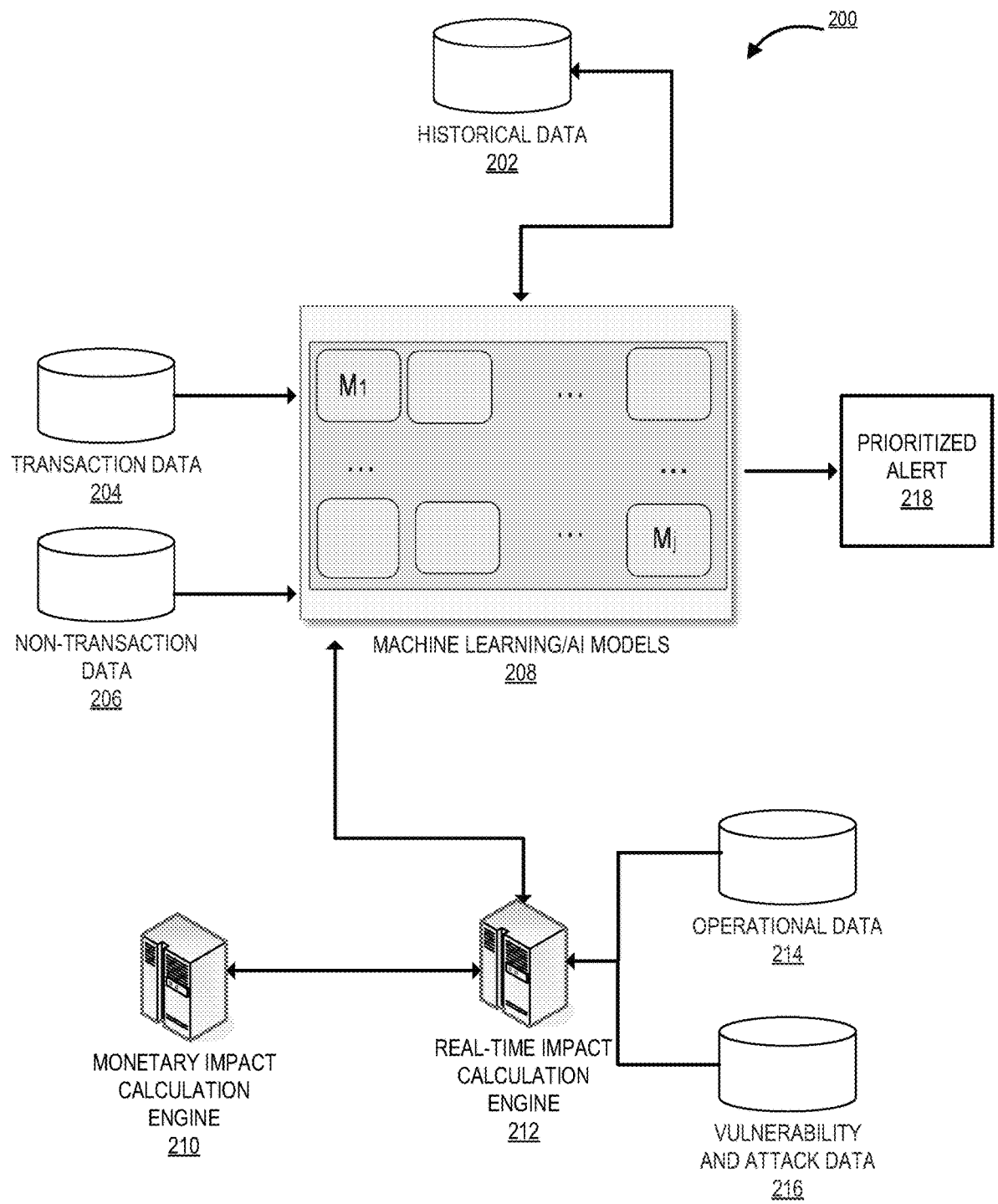
Figure 3:
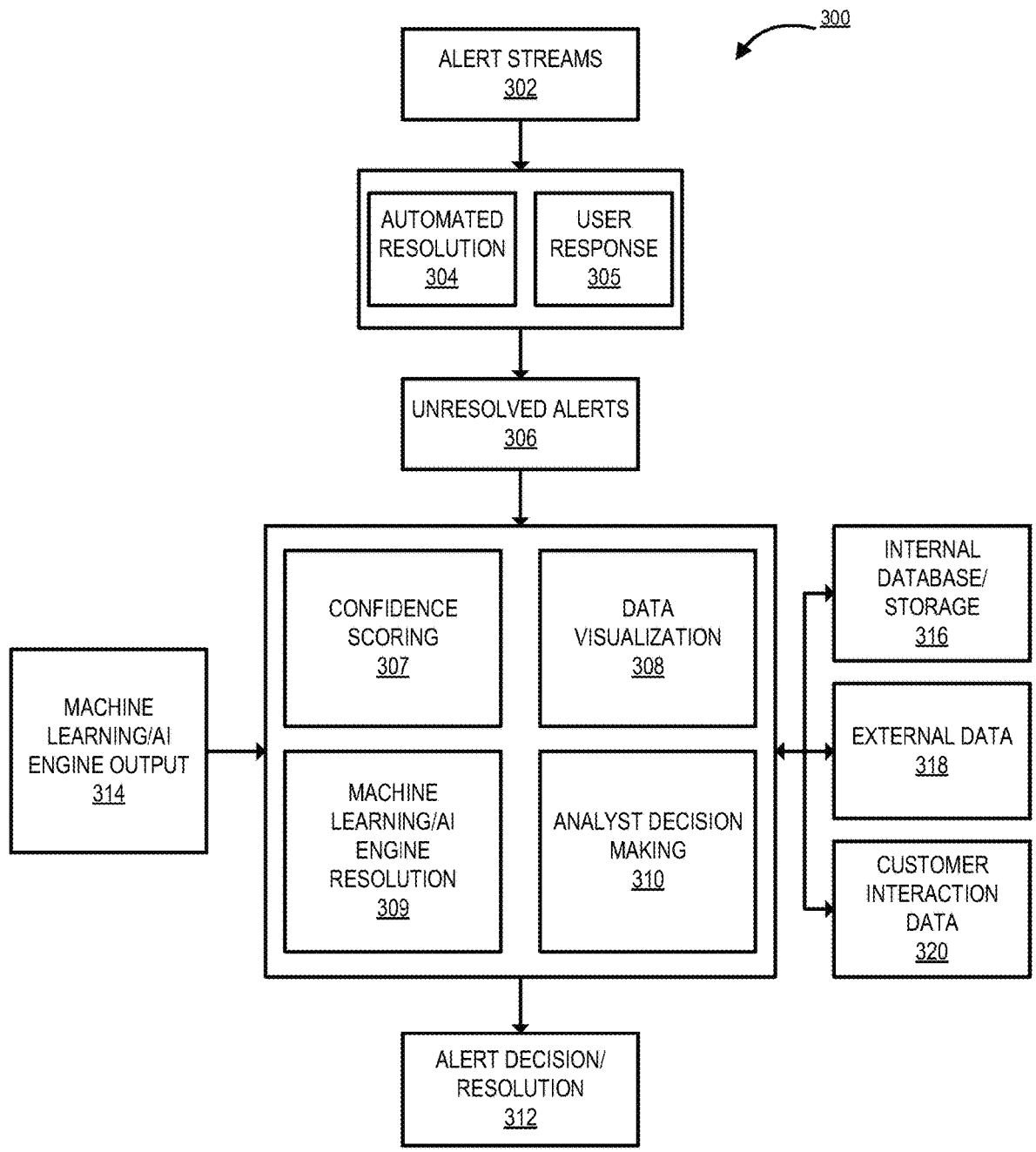
Figure 4:
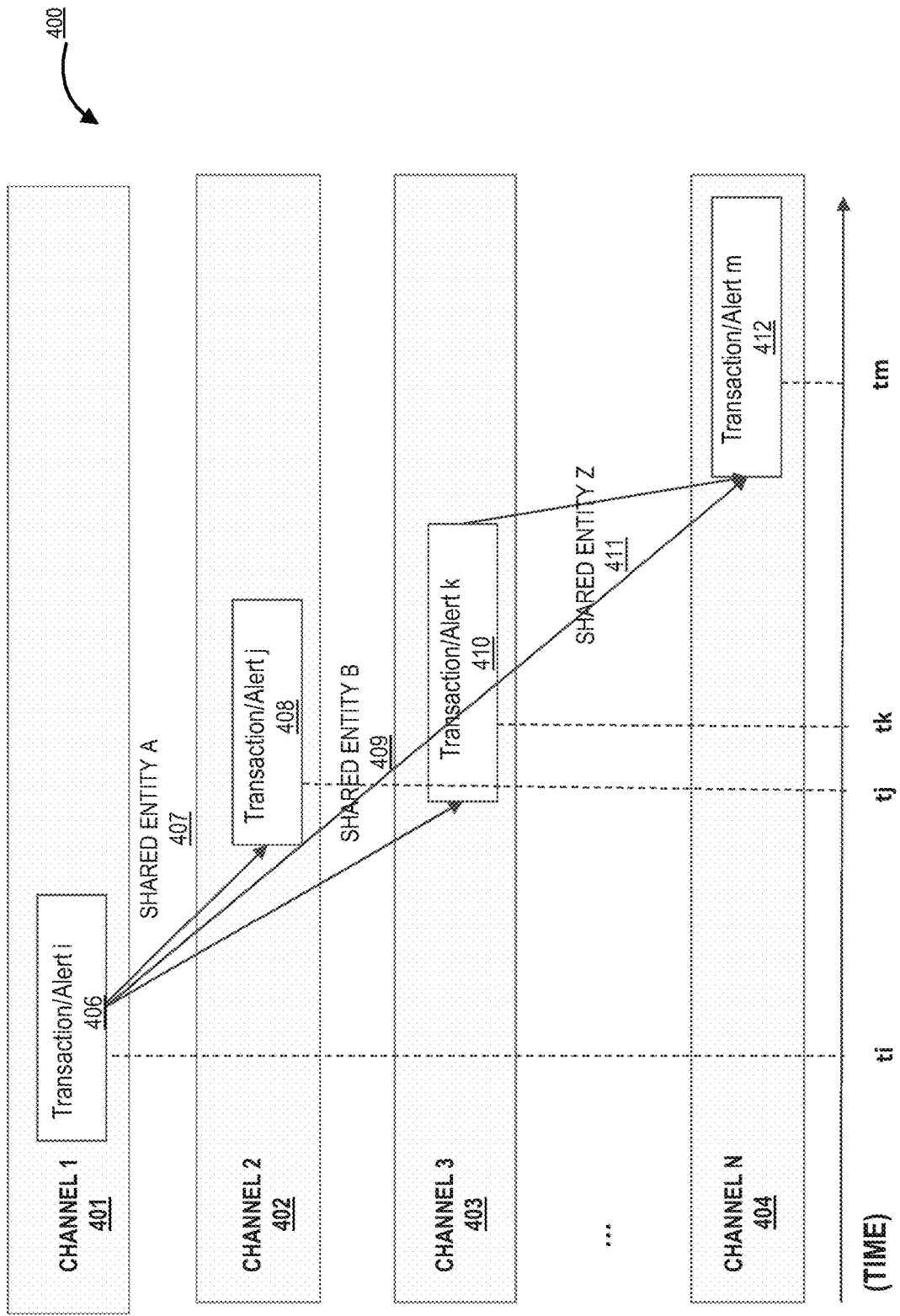
Figure 5:
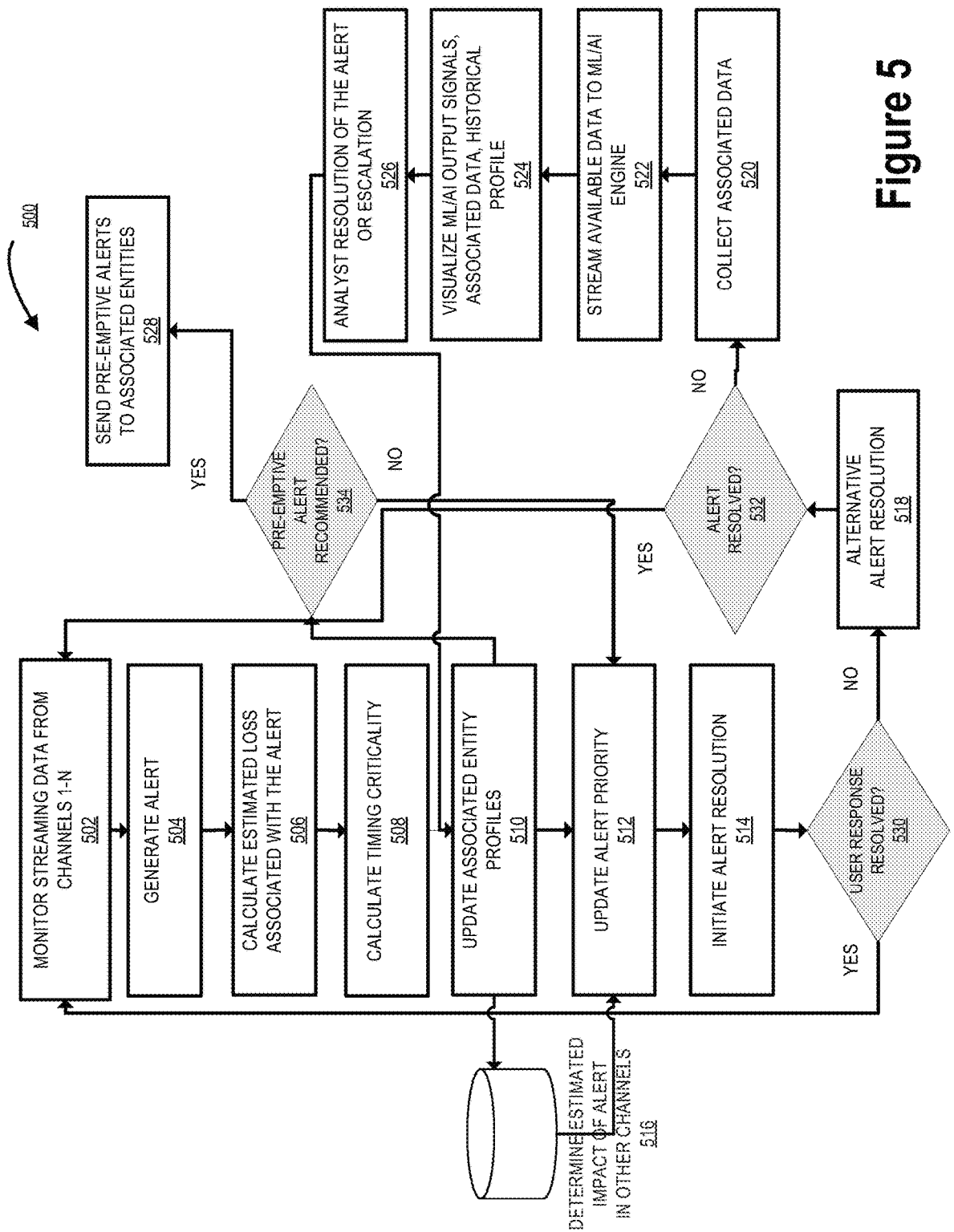
Figure 6:
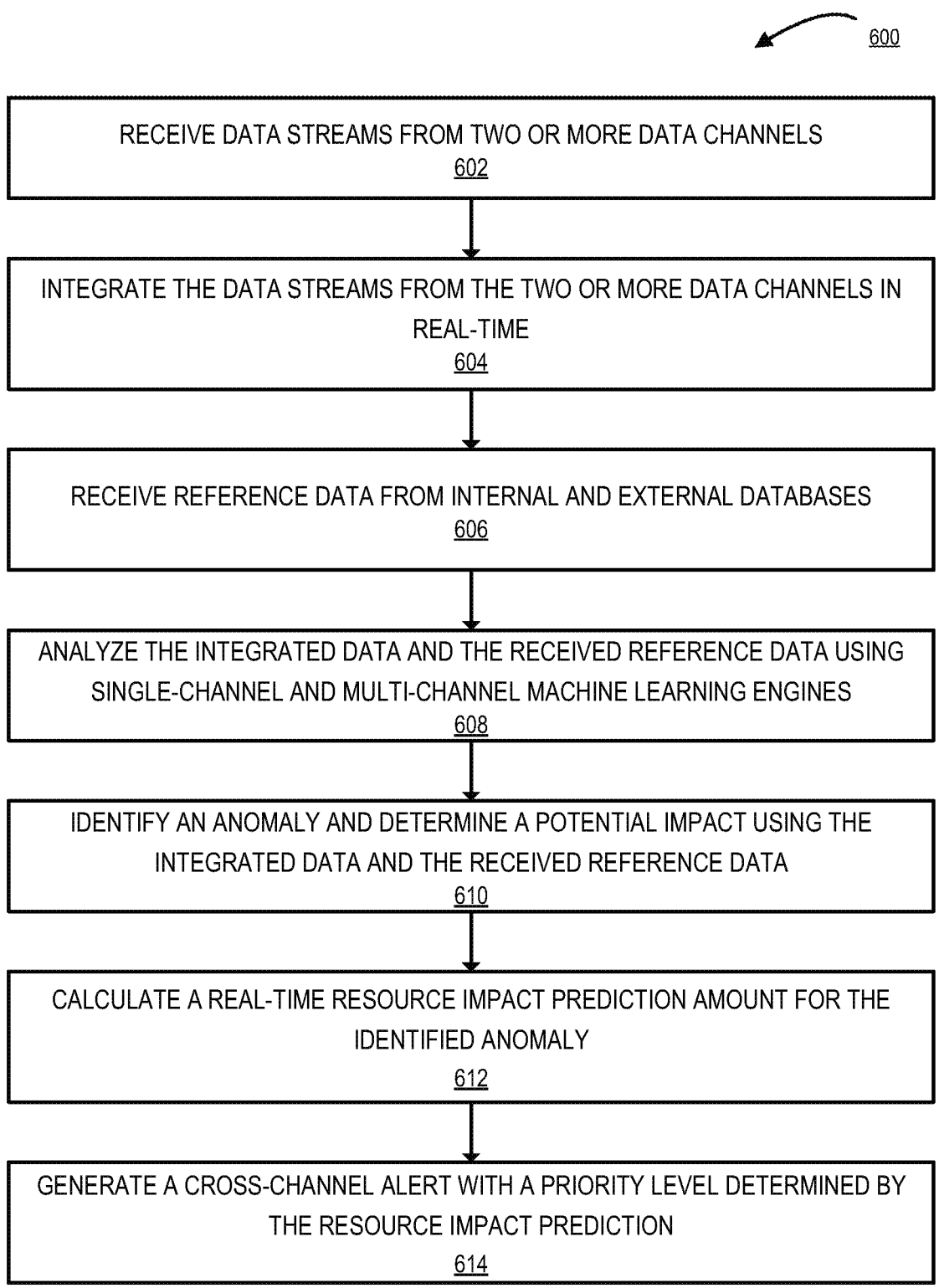

Having thus described embodiments of the invention in general terms, reference will now be made to the accompanying drawings, where:

FIG. 1 illustrates a cross-channel detection system with real-time dynamic notification processing system environment 100, in accordance with embodiments of the present invention;

FIG. 2 illustrates a process flow map of machine learning and artificial intelligence implementation at the entity level, in accordance with embodiments of the present invention;

FIG. 3 illustrates a flowchart for alert resolution, in accordance with embodiments of the present invention;

FIG. 4 illustrates a chronological depiction of cross-channel alert generation, in accordance with embodiments of the present invention;

FIG. 5 illustrates a flowchart for cross-channel detection system with real-time dynamic notification processing, in accordance with embodiments of the present invention; and FIG. 6 illustrates a high level flowchart of cross-channel detection system with real-time dynamic notification processing, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices and/or systems on which the continuous and competitive authentication system described herein is implemented. The entity may be a business organization, a non-profit organization, a government organization, and the like. "Entity system" or "alert prioritization system" as used herein may refer to the computing systems and/or other resources used by the entity to collect data and run the various processes needed to identify a user and/or anomalies and patterns in the collected data.

For the purposes of this invention, a "communication" may be any digital or electronic transmission of data, metadata, files, or the like. The communication may be originated by an individual, application, system within an entity. Furthermore, an "external party" may be one or more individuals, entities, systems, servers, or the like external to the entity. This may include third parties, partners, subsidiaries, or the like of the entity. A resource distribution, as used herein may be any transaction, fund transfer, credit card transaction, payment, or another distribution of resources from the user. Furthermore, a resource distribution may further include user authentications, locations, device usages, and the like.

"User" as used herein may refer to an individual who may attempt to use or access the system resources from the entity perspective, or may refer to any individual who is associated with resource impact, alert, or transaction data. In some embodiments, the user may be a customer, client, or prospective client of the entity who is identified as being exposed to a particular identified potential for misappropriation or unauthorized access. In other embodiments, the user may be an unauthorized and/or malicious individual who may be responsible for creating the anomaly or potential resource impact perceived by the system.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

"Channel" as used herein may refer to a source from which an entity may receive data associated with a user or a transaction. Accordingly, examples of channels may include user applications (e.g., programs, applications, and the like), voice communication lines (e.g., telephone, VoIP), an entity website, physical sites associated with the entity, call centers, and any number of transaction channels such as credit transactions, debit transactions, deposit transactions, automated teller machine (ATM) transactions, person-to-person (P2P) transactions, online transactions, distributed ledger transactions and the like.

Embodiments of the present invention provide a system, computer program product, and method for a cross-channel detection system with real-time dynamic notification processing. In particular, the system may continuously receive and collect data (e.g., transaction data, network data, historical data, user data, and the like.) through one or more various channels. In an exemplary embodiment, user data may be collected from a user each time a user places a telephone call to the entity. Similarly, a biometric data on the user's facial features, fingerprint, and/or iris may be collected each time the user connects to the entity's online systems using an application on a user device (e.g., a mobile application on a user's smartphone). The collected data may be related to a user, user habits, transaction details, network details, and may be in the form of partial data (e.g., a sample of voice data may be distorted or short in length); the continuous collection and integration of said data may help ensure that an accurate analysis of user data and network attributes and may be constructed even with partial data.

In some embodiments, the collected data may be stored in a historical database. In such embodiments, each time data is collected, said data may be compared to reference data (e.g., historical data or data provided from an external source) to detect patterns and generate a confidence score with respect to historical data or expected patterns. The entity system may, based on the comparison of collected data to reference data and detected patterns, calculate a confidence value which indicates the degree of consistency of the data with the historical data or expected patterns. Accordingly, if the active data is highly consistent (e.g., few or no discrepancies or inconsistencies are detected between the active and historical data or recognized patterns), the calculated confidence value may be high. Conversely, if the active data is inconsistent (e.g., multiple or significant discrepancies are detected), the calculated confidence value may be low, and may be labeled by the system as an anomaly. For example, a transaction performed on a specific channel related to the user's account with the entity may be recognized by the system as a larger than a typical transaction made by the user in that particular circumstance, generating a low confidence score. Additionally, the system may recognize that a certain transaction indicated by the collected data indicates abnormal user behavior. In either of these scenarios, the system may determine, using the confidence score and data from multiple other channels, that the transaction represents an anomaly, and may generate an alert. Said confidence value may be calculated each time data is collected, and the confidence value may be constantly updated. In other embodiments, the confidence value may be lowered based on other factors of interest to the entity, such as a known threat with regard to a certain channel, geographic location, geographic region, user, or the like. For instance, the entity may lower the confidence value associated with a particular user if the user's profile has been linked with prior unauthorized activity or if the user is traveling overseas in an area where other anomalies have been reported or detected.

In some embodiments, upon detecting that the confidence level has dropped below a specified threshold such that an anomaly is detected, the entity system may generate an alert and initiate one or more alert resolution processes. These alert resolution processes may include interaction with the user to request more data, acquiring data from other channels or entities, collecting data from an external source, utilizing machine learning and artificial intelligence engines to predict potential for misappropriation or unauthorized access, escalating the alert to an analyst or manager, and generating pre-emptive alerts to other entities. As such, the alerts generated by the system are not necessarily constrained to a particular channel, and may be transmitted across multiple channels. The multiple channels may communicate with the system to provide feedback based on the alert, allowing the system to map and analyze data across the multiple channels to detect emerging patterns and anomalies in a cross-channel fashion. Similarly, pre-emptive action may be taken to alert multiple channels of an anomaly detected in one or more other channels, allowing the system to prevent similar patterns from emerging elsewhere. Pre-emptive action may be limited to instances where predicted resource impact associated with the anomaly meets a certain threshold. For instance, the system may detect an anomaly in a given channel that affects a single user within that channel. Using historical data about the user's affected resources, the system may predict an resource impact value for the anomaly within the identified channel. By applying the emerging pattern analysis to other channels where the user may be affected, the system may determine that the predicted resource impact for the same user in a second channel may be substantial, and may pre-emptively alert the user in order to request more information. In some embodiments, the system may also take action autonomously by limiting access within a given channel until the user provides more authenticating information. The system may also alert the user or some associated entity to take preventative action in order to prevent predicted resource impacts. In still further embodiments, the system may transmit an alert to a group of users across multiple different channels upon determining that the users have the potential to be affected by the anomaly. The system may make this determination based on some commonality between the users, such as regional location or susceptibility based on their channel of communication or transaction.

The system may make a predicted resource impact calculation associated with an anomaly based on a number of factors (e.g., confidence score classification, monetary impact calculation, emerging patterns), and prioritize the alert with a potential resource impact score. In this way, the system may quantify potential resource impacts related to various anomalies, and may make a holistic determination based on a sum of overall potential resource impact scores when analyzed across multiple channels. In addition, the potential resource impact score may be scaled in a non-linear fashion in situations where cross-channel anomalies bearing a similar resource impact scores are detected, as this may indicate a broader anomaly occurring over multiple channels. Furthermore, potential resource impact scores may be compounded in certain instances where vulnerabilities have been detected over multiple channels which may have compromised a critical level of personal user information or account access.

Arranging a cross-channel detection system in this way addresses a number of technology-centric challenges compared to current technology. In particular, the present invention not only analyzes and processes alerts based on multiple channels to provide a more holistic view as compared to current technology, but also continuously collects data to positively identify patterns of transactions or user behaviors. As such, alerts do not remain in siloes on the channel in which they are created. Instead, the invention allows for the detection of emerging patterns across multiple channels and entities. This greatly increases the security of online systems which monitor resources distribution. Furthermore, the invention, by utilizing various forms of data from external sources and multiple channels, may mitigate the amount of damage that identified potential resource impacts may cause to the system, which may include financial impacts or other resource related impacts, both recoverable and unrecoverable.

FIG. 1 illustrates cross-channel detection system with real-time dynamic notification processing system environment 100, in accordance with embodiments of the present invention. FIG. 1 provides the system environment 100 for which the distributive network system with specialized data feeds extract information for information security vulnerability assessments for the user. FIG. 1 provides a unique system that includes specialized servers and system communicably linked across a distributive network of nodes required to perform the functions for cross-channel detection.

As illustrated in FIG. 1, the cross-channel detection and alert prioritization system (the "system") 106 is operatively coupled, via a network 101 to the user device 104, and to the third party entity systems 140. In this way, the system 106 can send information to and receive information from the user device 104, and the third party entity systems 140. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is may refer to an individual who may use or access the system resources from the entity perspective, or may refer to any individual who is associated with resource impact, alert, or transaction data. As such, the user 102 may be any individual performing a transaction or resource distribution using a credit card, debit card, cash, check, mobile wallet, or the like. In some embodiments, the user may be a customer, client, or prospective client of the entity who is identified as being exposed to a particular identified potential for misappropriation or unauthorized access. In other embodiments, the user may be an unauthorized and/or malicious individual who may be responsible for creating the anomaly or potential resource impact perceived by the system. FIG. 1 also illustrates a user device 104. The user device 104 may be, for example, a desktop personal computer, business computer, business system, business server, business network, a mobile system, such as a cellular phone, smart phone, personal data assistant (PDA), laptop, or the like. The user device 104 generally comprises a communication component 108, a processing component 110, and a memory component 112. The processing component 110 is operatively coupled to the communication component 108 and the memory component 112. The processing component 110 uses the communication component 108 to communicate with the network 101 and other devices on the network 101, such as, but not limited to the third party entity systems 140, and the system 106. As such, the communication component 108 generally comprises a modem, server, or other device for communicating with other devices on the network 101.

The user device 104 comprises computer-readable instructions 114 and data store 118 stored in the memory component 112, which in one embodiment includes the computer-readable instructions 114 of a user application 116.

As further illustrated in FIG. 1, the system 106 generally comprises a communication component 120, a processing component 122, and a memory component 124. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing component 122 is operatively coupled to the communication component 120 and the memory component 124. The processing component 122 uses the communication component 120 to communicate with the network 101 and other devices on the network 101, such as, but not limited to the third party entity systems 140, and the user device 104. As such, the communication component 120 generally comprises a modem, server, or other device for communicating with other devices on the network 101.

As further illustrated in FIG. 1, the system 106 comprises computer-readable instructions 126 stored in the memory component 124, which in one embodiment includes the computer-readable instructions 126 of an application 128. In some embodiments, the memory component 124 includes data storage 130 for storing data related to the system environment 100, but not limited to data created and/or used by the application 128.

In one embodiment of the system 106 the memory component 124 stores an application 128. Furthermore, the system 106, using the processing component 122 codes certain communication functions described herein. In one embodiment, the computer-executable program code of an application associated with the application 128 may also instruct the processing component 122 to perform certain logic, data processing, and data storing functions of the application. The processing component 122 is configured to use the communication component 120 to communicate with and ascertain data from one or more of the third party entity systems 140 and/or user device 104. Additionally, system 106 may include one or more machine learning or artificial intelligence models or machine learning/AI engines configured to analyze received data and interact with other system processes.

In some embodiments, the user 102 may be utilizing the user device 104 to generate a communication. The communication may be a digital or electronic communication such as email, text message, or the like. The communication may further include information such as data, files, metadata, or the like associated with the user or the entity. The communication may be initiated by the user 102 with the desired receiver of the communication being an individual outside the entity and associated with a third party entity systems 140. Upon generation of the communication, the user may attempt to send the communication with the information to the external party. The system 106 recognizes the generation of the communication and performs a vulnerability assessment of the communication to approve the communication for a permit to send.

The system 106 may operate to perform the authenticity identification processes. In some embodiments, the system 106 may perform hierarchical learning of data and behavior modeling to identify normal resource distribution of a user irrespective of the user lifestyle or resource distribution habits. In this way, in some embodiments, the system 106 may perform phase-based characterization of interactions and resource distribution for authenticity identification. In some embodiments, the system 106 may perform collective analysis across channels for authenticity identification. In some embodiments, the system 106 may perform neural network cross training for authenticity identification. In some embodiments, the system 106 may perform hierarchical clustering for authenticity identification. In some embodiments, the system 106 may perform misappropriation analysis for authenticity identification. In some embodiments, the system 106 may perform one or more of these functions to perform authenticity identification using dynamic hierarchical learning.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a process flow map of machine learning and artificial intelligence implementation 200 at the entity level, in accordance with embodiments of the present invention. As shown, the machine learning and artificial intelligence models 208 receive and integrate data from various sources to detect cross-channel anomalies and generate prioritized alerts. One such source is historical data 202, which may contain data related to transactions, clients, entities, network patterns, various resource impact data, and past claims of intrusion or deception. Also shown are transaction data 204 and non-transaction data 206. Transaction data 204 may include features of a particular transaction such as amount, initiating user, receiving user, account number, account amount, geographic location, pre-determined geographic region, and related entity information. Non-transaction data may encompass any other data that is not necessarily related to a transaction specifically (e.g., a user's change of address, change of phone number, and the like.) that may be useful in determining whether or not a cross-channel anomaly is present.

As shown, the machine learning/AI models 208 are configured to interact with real-time impact calculation engine 212. The real-time impact calculation engine is designed to aid in classification of system results as potential resource impacts, and combines data from multiple sources to calculate a quantified impact score associated with identified potential resource impact, both in an immediate sense as well as related to downstream potential resource impacts. Additionally the real-time impact calculation engine may incorporate metrics for potential impacts and emerging misappropriation patterns to better provide an accurate classification result. The real-time impact calculation engine may receive operational data 214 and vulnerability and attack data 216. Operational data may comprise processing and operational costs, deadlines for service level agreements, and contract terms and obligations that may vary between entity and third party entities or clients, thereby allowing the system to foresee complications that may arise downstream with regard to missed deadlines and other possible operational costs.

Vulnerability and attack data 216 includes data that is known to the entity, system, or users about real-time vulnerability, real-time attack data, account takeover data, and hotfiles (e.g., internet protocol (IP) addresses, phone numbers, usernames, and the like. associated with known deceptive tactics). The system may use this data to determine scope of impact by more accurately quantifying the magnitude of impact and level of exposure to unauthorized access. In addition, incorporation of vulnerability and attack data may save time by allowing the real-time impact calculation engine to immediately identify a potential resource impact by similarity to known vulnerabilities and using this information to anticipate downstream impact in multiple other channels.

The real-time impact calculation engine may also communicate and cooperate with monetary impact calculation engine 210. The monetary impact calculation engine is designed to quantify and categorize the potential impact of detected anomalies in terms of potential resource impacts. For instance, the monetary impact calculation engine may receive information from the system as to particular users, entities, and channels that may be affected by a detected anomaly. Based on these characteristics, the monetary impact engine may calculate the potential impact for a given transaction, a particular account, or a particular user or client. Additionally, the system may extrapolate a user-case scenario and apply it to a broadened scenario of affected users and entities based on the data received from the system. For instance, the machine learning and AI models may indicate that the anomaly pattern exists throughout an entity in a certain geographic location or pre-determined geographic region, and that the anomaly is emerging as an ongoing pattern that may affect a certain number of users across multiple channels. In this case, the monetary impact calculation engine will quantify the potential impact as it applies to the entire collection of potentially affected users. The real-time impact calculation engine can then use this information to calculate a potential impact score that the system may ultimately rely on in part in the prioritization and/or escalation of the generated alert. Additionally, the monetary impact calculation engine may classify impacts as recoverable or unrecoverable, further allowing the real-time impact calculation engine to accurately prioritize various potential impacts and anomalies and generate a prioritized alert 218.

FIG. 3 illustrates a flowchart 300 for alert resolution, in accordance with embodiments of the present invention. As shown in block 302, the system produces or receives alert streams which begin the process of alert resolution by being sorted into preliminary alert resolution process of either automated resolution 304 or user response 305. In this way, the system can pare down the number of alerts that it integrates and analyzes in the cross-channel analysis and limit the amount of extraneous data entering the system which may skew the impact scoring process. In some embodiments, the system may attempt to resolve an alert by either or both of these methods, depending on the priority level assigned. The automated response may be configured to automate the resolution of certain alerts. For instance, a user who manages the system may configure an automated action to resolve a routine alert that the user expects to be received or generated by the system, such as a planned transaction that will be expected to be flagged as an anomaly by virtue of its transaction characteristics. In other embodiments, a user who is a customer of the managing entity may configure their user preferences to include an automated response to an alert generated by the system. Furthermore, as shown in block 305, the system may also solicit a response from a user, whereby the user might dictate how the alert should be resolved. For instance, the user may set a preference to be alerted of an anomaly or resource impact affecting their account if the expected resource impact is above a certain threshold amount. In some embodiments, the user may take a pre-emptive action to avoid potential downstream resource impacts in various other channels.

As shown in block 306, some alerts will not be resolved by either of the preliminary resolution methods, in which case the system will analyze the alerts to detect cross-channels anomalies and potential resource impacts. The system may identify these unresolved alerts and manage them by using a number of additional tools and methodologies, as depicted by confidence scoring 307, data visualization 308, machine learning/AI engine resolution 309, and analyst decision making 310. Any and all of these tools and methodologies may be interrelated with a number of other data streams, as indicated by the surrounding illustrated blocks such as machine learning/AI engine output 314, internal database/storage 316, external database/storage 318, and customer interaction data 320. As shown, data received by the system from internal database and external database may be integrated with confidence scoring, and the system may determine inconsistencies between the data. Internal database storage may contain reference data from the managing entity or historical data produced or utilized by the system that has been stored for later reference. Additionally, the system may also employ external data in some embodiments, such as reference or historical data retrieved from databases managed by third party entities. In some embodiments, the system may also incorporate data from customer interactions, such as data received during a phone call with a customer. For instance, the system may detect an anomaly across multiple channels and prompt a user of the system, such as an analyst, to begin communication with an entity customer to obtain verification of some variable, such as location of a recent transaction. An affirmation by the customer as to the legitimacy of the recent transaction and any other information from multiple channels may be incorporated by the system in the confidence scoring process.

As illustrated, the system may also visualize data in some embodiments. The system may visualize relevant internal or external data, scores from machine learning and AI engines, and various rule or policy violations that may have been identified by the system across one or more channels. In this way, the system may assist in the decision making process of a system analyst or user by visualizing cross-channel anomalies and calculated potential resource impacts. The system may visualize data in a number of ways, including using charts, tables, various graphical user interface outputs, and the like. Additionally, the system may incorporate a graph database approach in the visualization of relevant data and relationships between data from various channels. The analyst may use the visualization to better understand the system data output and relationships identified by the systems machine learning and AI processes. As shown by analyst decision making 310, the system may prompt a decision by either a human analyst or some automated process at this stage, with the ultimate goal of resolving the alert, as depicted at alert decision//resolution 312.

FIG. 4 illustrates a chronological depiction 400 of cross-channel alert generation, in accordance with embodiments of the present invention. The system's cross channel detection approach relies on potential resource impact estimates and identified anomalies and potential resource impacts from cross-channel data and models to prioritize alerts in real-time. In some embodiments, the multiple channels may exist across multiple shared entities, and various alerts may be generated by the system as to events occurring in the channels. These alerts may be generated at different points in time, as shown by the time axis at the bottom FIG. 4. As such, the system may identify a timing criticality and stagger alerts based on the timing criticality of the alert with respect to the identified anomaly or known characteristics about a user or entity. For instance, an anomaly may be detected in a channel associated with debit transactions for the user, in which case the system might calculate a potential resource impact prediction based on a full account takeover. The system may also recognize or detect an anomaly in a channel associated with the user's credit card transactions, wherein the system might calculate a lower impact prediction due to the nature of potential resource loss being fully or partially recoverable, whereas a full debit account takeover may be totally unrecoverable. In this instance, the system may then determine a timing criticality based on the potential resource impact prediction and issue an alert to the user in the debit channel prior to issuing the alert in the credit channel. In some embodiments, the alert may be issued simultaneously. In some embodiments, the system may detect an emerging pattern which indicates the potential resource impacts in one or more channels. In this case, the system may issue a pre-emptive alert to potentially affected users, and the system may take into account the timing criticality with regard to pre-emptive alerting as well. In some embodiments, as the system generates the alerts associated various events occurring in each channel, the system may identify relationships between channels and between upstream/downstream alerts.

As shown in in FIG. 4, the system may identify an alert associated with a transaction in a first channel 401, as illustrated by transaction/alert i 406. As time progresses from ti to tj, the system may identify a related transaction or event occurring in a second channel 402, and may generate a transaction/alert j 408, while simultaneously integrating the data from both channels to predict downstream resource impacts and potential resource impacts across multiple channels. This is further depicted in FIG. 4 by the third channel 403, and channel "n" 404 and corresponding transaction/alerts 410 and 412 which are identified with respect to shared entity B 409 and shared entity Z 411. It is understood that the system may analyze any number of channels that may produce data associated with a particular entity user, account, transaction, or other identifying characteristic. In some embodiments, the term shared entity may refer to a point of sale system, ATM, or any other point of potential contact between the entity system and a client or user. Shared entity may also refer to a third party entity that has a relationship or partnership with the entity managing the system such that system processes of the entities may be interrelated or affect one another in some way.

FIG. 5 illustrates a flowchart for cross-channel detection system with real-time dynamic notification processing, in accordance with embodiments of the present invention. As shown, the system process begins by monitoring streaming data from channels 1-N, as shown by block 502. The system may use the streaming data to identify an anomaly associated with a transaction, user, customer, or other identifying characteristic, and may use this data to generate an alert, as shown by block 504. At this point, the system may then apply data from other sources, such as reference or historic data from either internal or external data sources to calculate estimated resource impact associated with the alert, as shown by block 506. In some embodiments, the system may then calculate the timing criticality of the alert, as shown by block 508, and store the calculation in an associated entity profile as shown at block 510. For instance, the system may analyze the potential effects of the alert in terms of downstream resource impact in the same or multiple other channels. This calculation can be used as a determination of other system action, such recommending a pre-emptive alert, or updating the alert priority to a lower or higher priority level. The determination of system action in this regard is interrelated with the determination of the resource impact of the alerted anomaly or situation in other channels, as shown by block 516. This determination is based partly on the data received from the user response, which may contain additional information needed to calculate an accurate resource impact or potential resource impact for downstream events in other channels. If a pre-emptive alert is recommended, either by automated system instructions or by human analyst instructions, the system may send pre-emptive alerts to associated entities across multiple other channels that may be affected downstream, as shown by block 528 and block 534.

Whether or not a pre-emptive alert is recommended, the system may update alert priority in the associated entity profile and historical data stores, as shown by block 512. The system may then initiate alert resolution, as shown by block 514. If the alert can be resolved by a user response, that is, by either an entity user or some other user interacting with the system, such as an entity customer or client, the system returns to monitoring streaming data from the multiple data channels, as shown by block 530. In some embodiments, the system may instead or in addition move on to an alternative alert resolution, such limiting access to an entity account, contacting external entities, escalating the alert to an analyst, or some other automated response, as represented by block 518, alternative alert resolution.

If the alert is resolved at this stage, the system may return the system resources to the monitoring stage 502, as shown by block 532. However, if the alert is not resolved, the process may collect associated data 520 from an array of sources, including internal and external data sources, and stream any available data about the alert to the machine learning and AI engines 522. The system may then visualize the output signals from the machine learning and AI engines, along with associated data obtained from other sources, and any historical profile or reference data that the system may have retained, as shown at block 524. At this point, an analyst may use the visualized data to resolve the alert, or escalate the alert, as shown by block 526. Finally, the visualized data and/or associated data is linked to the associated entity profiles, as shown by the link between this later stage of the process and the update associated entity profile stage 510.

FIG. 6 illustrates a high level flowchart 600 of cross-channel detection system with real-time dynamic notification processing, in accordance with embodiments of the present invention. The process is initiated at block 602 when the system receives data streams from two or more disparate data channels, meaning that the channels exist in separate siloes of communication and did not previously cross-communicate with one another. The data may contain identifying characteristics (e.g., user identification, transaction identification, account identification, entity identification, and the like.) that may be used by the system to integrate the data. In some embodiments, the system uses identifying characteristics of the data to integrate the data from the two or more data channels in real-time, as illustrated by block 604.

As described previously, the system is also designed to receive reference and historical data from internal and external databases, as shown by block 606. In some embodiments, this data may be useful to the system's analysis of the integrated data from multiple channels to detect anomalies. At this step, the system may use the integrated data from the two or more data channels and the received reference data to perform an analysis, as shown by block 608. The integrated data and received reference data can be analyzed in a single channel or multiple channel fashion to detect anomalies. Once an anomaly is detected by the system, a potential resource impact value may be calculated as to the potential effect of the anomaly on downstream users, entities, and channels, as shown by block 610. In addition to identifying the existence of an anomaly, the system may also calculate a real-time resource impact prediction for the identified anomaly, as shown by block 612, which may include both recoverable and unrecoverable resource impacts, as well as monetary and operational impacts. Finally, the system may generate a cross-channel alert with a prioritized score, as shown by block 614.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authentication and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cross-channel detection with real-time dynamic alert processing and prioritization, the system comprising: a plurality of data channels configured to transmit a plurality of data streams; and a controller for integrating the plurality of data channels, the controller comprising a memory device with computer-readable program code stored thereon, a communication device, and a processing device operatively coupled to the memory device and the communication device, wherein the processing device is configured to execute the computer-readable program code to: receive the plurality of data streams from the plurality of data channels, wherein the plurality of data channels produce disparate streams of data; integrate the disparate stream of data from the plurality of data channels in real-time; receive reference data from internal and external databases, wherein the reference data is categorized according to entity, user, and transaction identification characteristics; analyze the integrated data and the received reference data using single-channel and multi-channel machine learning engines to identify an anomaly in the integrated data; calculate a resource impact prediction for the identified anomaly, wherein the resource impact prediction is calculated for a specific resource transfer, user, channel, or entity, and wherein the resource impact prediction is categorized as recoverable or unrecoverable; and generate a cross-channel alert across plurality of data channels with a priority level determined by the resource impact prediction.

2. The system of claim 1, wherein the system is further configured to: identify two or more anomalies occurring in a specified channel within a predefined time period; determine that a pattern of unauthorized activity is emerging in the specified channel based on the identifies anomalies; identify one or more potentially impacted users within the specified channel; and transmit a pre-emptive alert to the one or more potentially impacted users.

3. The system of claim 2, further comprising: analyzing the resource impact prediction in a second specified channel for the one or more potentially impacted users; and transmitting a second pre-emptive alert to the one or more potentially impacted users over the second specified channel.

4. The system of claim 2, further comprising: identifying a geographic region affected by the emerging pattern of unauthorized activity; receiving location data for the one or more potentially impacted users via one or more of the plurality of data channels; identifying a number of potentially impacted users located within the geographic region affected by the emerging pattern of unauthorized activity; and transmitting the pre-emptive alert to the number of potentially impacted users located within the geographic region affected by the emerging pattern of unauthorized activity.

5. The system of claim 1, wherein integration of data from the plurality of data channels further comprises combining the data into an entity or user profile based on user identification characteristics or transaction identification characteristics.

6. The system of claim 1, wherein the system is further configured to transmit the cross-channel alert to a plurality of affected users, wherein the alert contains a description of the identified anomaly and a request for verification information; receive responses from the plurality of affected users, wherein the responses contain a verification of the identified anomaly; and resolve the cross-channel alert based on the received responses from the plurality of affected users.

7. A computer implemented method for cross-channel detection with real-time dynamic alert processing and prioritization, comprising: providing a computing system comprising a computer processing device and a non-transitory computer readable medium, where the computer readable medium comprises configured computer program instruction code, such that when said instruction code is operated by said computer processing device, said computer processing device performs the following operations: receiving a plurality of data streams from a plurality of data channels, wherein the plurality of data channels produce disparate streams of data; integrating the disparate steams of data from the plurality of data channels in real-time; receiving reference data from internal and external databases, wherein the reference data is categorized according to entity, user, and transaction identification characteristics; analyzing the integrated data and the received reference data using single-channel and multi-channel machine learning engines to identify an anomaly in the integrated data; calculating a resource impact prediction for the identified anomaly, wherein the resource impact prediction is calculated for a specific resource transfer, user, channel, or entity, and wherein the resource impact prediction is categorized as recoverable or unrecoverable; and generating a cross-channel alert across plurality of data channels with a priority level determined by the resource impact prediction.

8. The computer implemented method of claim 7, further comprising: identifying two or more anomalies occurring in a specified channel within a predefined time period; determining that a pattern of unauthorized activity is emerging in the specified channel; identifying one or more potentially impacted users within the specified channel; and transmitting a pre-emptive alert to the one or more potentially impacted users.

9. The computer implemented method of claim 8, further comprising: analyzing the resource impact prediction in a second specified channel for the one or more potentially impacted users; and transmitting a second pre-emptive alert to the one or more potentially impacted users over the second specified channel.

10. The computer implemented method of claim 8, further comprising: identifying a geographic region affected by the emerging pattern of unauthorized activity; receiving location data for the one or more potentially impacted users via one or more of the plurality of data channels; identifying a number of potentially impacted users as located within the geographic region affected by the emerging pattern of unauthorized activity; and transmitting the pre-emptive alert to the number of potentially impacted users located within the geographic region affected by the emerging pattern of unauthorized activity.

11. The computer implemented method of claim 7, wherein integration of data from the plurality of data channels further comprises combining the data into an entity or user profile based on user identification characteristics or transaction identification characteristics.

12. The computer implemented method of claim 7, further configured to transmit the cross-channel alert to a plurality of affected users, wherein the alert contains a description of the identified anomaly and a request for verification information; receive responses from the plurality of affected users, wherein the responses contain a verification of the identified anomaly; and resolve the cross-channel alert based on the received responses from the plurality of affected users.

13. A system for cross-channel detection with real-time dynamic alert processing and prioritization, the system comprising: a plurality of data channels configured to transmit a plurality of data streams; and a controller for integrating the plurality of data channels, the controller comprising a memory device with computer-readable program code stored thereon, a communication device, and a processing device operatively coupled to the memory device and the communication device, wherein the processing device is configured to execute the computer-readable program code to: receive data from a plurality of data channels, wherein the data channels represent disparate streams of data; integrate the disparate streams of data from the plurality of data channels in real-time; receive reference data from internal and external databases, wherein the reference data is categorized according to entity, user, and transaction identification characteristics; analyze the integrated data and the received reference data to identify an anomaly in two or more of the plurality of data channels; calculate a channel-specific real-time dynamic resource impact prediction for the identified anomaly, wherein the resource impact prediction is calculated for a specific resource transfer, user, channel, or entity, and wherein the resource impact prediction is categorized as recoverable or unrecoverable; generate a channel-specific alert for each of the plurality of channels affected by the anomaly, wherein the channel specific alert contains a priority level based on the channel-specific dynamic resource impact prediction.

14. The system of claim 13, wherein the system is further configured to: determine a timing criticality associated with the channel-specific alert for each of the plurality of channels; and transmit the channel-specific alerts to an affected user in a sequence determined by the timing criticality.

15. The system of claim 13, wherein the system is further configured to: receive a response from the affected user, wherein the response contains a channel-specific verification of the identified anomaly; and update the timing criticality of downstream alerts based on the received response from the affected user.

16. A system for cross-channel detection with real-time dynamic alert processing and prioritization, the system comprising: a plurality of data channels configured to transmit a plurality of data streams; and a controller for integrating the plurality of data channels, the controller comprising a memory device with computer-readable program code stored thereon, a communication device, and a processing device operatively coupled to the memory device and the communication device, wherein the processing device is configured to execute the computer-readable program code to: receive data from a plurality of data channels, wherein the data channels represent disparate streams of data; integrate the disparate streams of data from the plurality of data channels in real-time; receive reference data from internal and external databases, wherein the reference data is categorized according to entity, user, and transaction identification characteristics; analyze the integrated data and the received reference data to identify an emerging pattern of exposure within a specific channel at a known entity location; receive location data for a user and determine that the user is at the known entity location; and transmit a pre-emptive alert to the user describing the identified emerging pattern of exposure, wherein a resource impact prediction is calculated for a specific resource transfer, user, channel, or entity, and wherein the resource impact prediction is categorized as recoverable or unrecoverable.

17. The system of claim 16, wherein the system is further configured to: determine a potential resource impact prediction for the emerging pattern of exposure within the specific channel; and generate dynamic potential resource impact score, wherein the dynamic potential resource impact score is updated in real-time as the system receives additional data from the plurality of data channels.

18. The system of claim 17, wherein the system is further configured to generate a channel-specific timing criticality for the pre-emptive alert based on the dynamic potential resource impact score and received reference data, and determine a staggered order for multiple pre-emptive alerts across the plurality of channels, wherein the timing criticality determines the staggered order for transmitting the pre-emptive alerts to the user across the plurality of channels.

* * * * *